US012637550B2

(12) United States Patent
Yang et al.

(10) Patent No.: US 12,637,550 B2
(45) Date of Patent: May 26, 2026

(54) PREPREG AND USES THEREOF

(71) Applicant: TAIWAN UNION TECHNOLOGY CORPORATION, Zhubei City (TW)

(72) Inventors: Wei-Jung Yang, Zhubei City (TW); Meng-Huei Chen, Zhubei City (TW)

(73) Assignee: TAIWAN UNION TECHNOLOGY CORPORATION, Zhubei City (TW)

( * ) Notice: Subject to any disclaimer, the term of this patent is extended or adjusted under 35 U.S.C. 154(b) by 297 days.

(21) Appl. No.: 18/054,399

(22) Filed: Nov. 10, 2022

(65) Prior Publication Data

US 2024/0150532 A1 May 9, 2024

(30) Foreign Application Priority Data

Oct. 19, 2022 (TW) ................................. 111139710

(51) Int. Cl.
*C08J 5/24* (2006.01)
*C08K 5/3492* (2006.01)

(52) U.S. Cl.
CPC ............. *C08J 5/246* (2021.05); *C08K 5/3492* (2013.01); *C08J 2371/12* (2013.01)

(58) Field of Classification Search
CPC ........ C08J 5/246; C08J 2371/12; C08J 5/244; C08J 5/249; C08K 5/3492
See application file for complete search history.

(56) References Cited

U.S. PATENT DOCUMENTS 4,176,027 A * 11/1979 Gotcher ............... C08K 5/3477 525/326.3
5,218,030 A 6/1993 Katayose et al.
5,352,745 A 10/1994 Katayose et al.
6,352,782 B2 3/2002 Yeager et al.
6,995,195 B2 2/2006 Ishii et al.
9,809,690 B2 11/2017 Koes
10,023,707 B2 7/2018 Liao et al.
2007/0129502 A1* 6/2007 Kawabe .................. C08L 53/00 525/391
2007/0155923 A1 7/2007 Kawabe
2016/0280913 A1* 9/2016 Liu ....................... C08L 71/126
2017/0009061 A1 1/2017 Cai et al.
2021/0108073 A1 4/2021 Kawabe et al.
2021/0246251 A1 8/2021 Sato et al.

FOREIGN PATENT DOCUMENTS

JP 2003-002992 A 1/2003
JP 2005-238477 A 9/2005
TW 201736413 A 10/2017

OTHER PUBLICATIONS

Office Action and Search Report received in Taiwanese Application No. 111139710, dated Apr. 1, 2023.

* cited by examiner

*Primary Examiner* — Larissa Rowe Emrich
(74) *Attorney, Agent, or Firm* — Greer, Burns & Crain, Ltd

(57) ABSTRACT

A prepreg and uses thereof are provided. The prepreg includes an organic fiber woven fabric impregnated or coated with a thermally curable resin composition, wherein the thermally curable resin composition includes:

(A) a polyphenylene ether resin having an unsaturated functional group;
(B) a polyfunctional vinyl aromatic copolymer; and
(C) a compound having the structure of formula (I), formula (I)

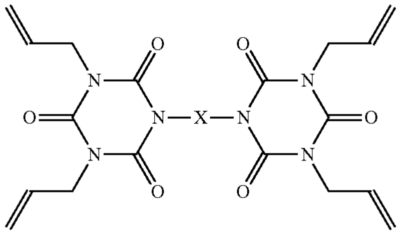

wherein, in formula (I), X is a C1-C10 linear or branched alkylene; and the polyfunctional vinyl aromatic copolymer is prepared by copolymerizing one or more divinyl aromatic compounds with one or more monovinyl aromatic compounds.

10 Claims, No Drawings

PREPREG AND USES THEREOF

REFERENCE TO RELATED APPLICATION

This application claims the benefit of Taiwan Patent Application No. 111139710 filed on Oct. 19, 2022, the subject matter of which is entirely incorporated herein by reference.

BACKGROUND

Field of the Invention

The present invention provides a prepreg, especially a prepreg comprising an organic fiber woven fabric impregnated with or coated with a specific thermally curable resin composition. The present invention also provides a laminate and printed circuit board prepared using the prepreg.

Descriptions of the Related Art

Printed circuit boards can be used as substrates of electronic devices and can load other electronic components and electrically connect the components to provide a stable circuit working environment. Printed circuit boards are primarily made from laminate, which is formed by superimposing dielectric layers and conductive layers. In general, a printed circuit board can be prepared using the following method.

First, a reinforcing material (such as glass fiber fabric) is impregnated in a resin composition (such as an epoxy resin composition), and the reinforcing material impregnated with the resin composition is cured to a semi-cured state (i.e., B-stage) to obtain a prepreg as the dielectric layer. After that, a predetermined number of dielectric layers (prepreg) are superimposed, and a conductive layer (e.g., a metal foil) is superimposed on at least one external surface of the superimposed prepregs to provide a superimposed object. Then the superimposed object is hot-pressed (i.e., C-stage) to obtain a metal-clad laminate. The conductive layer on the surface of the metal-clad laminate is etched to form a circuit pattern. Finally, the etched laminate is subjected to a drilling process to form a plurality of holes, and these holes are plated with a conductive material to form via holes to accomplish preparation of the printed circuit board. A commonly used material of the aforementioned reinforcing material is glass fabric. However, due to poor Young's modulus, glass fabric reinforcing material is prone to deform, and the deformation may result in disconnection between electronic components and laminates.

Since the electronic products in the field of electronic telecommunications have to be operated at higher frequencies and speeds due to the increasing amount of data transmission, there are higher demands on the dielectric properties of the electronic materials. As a result of the development of high-frequency and high-speed signal transmission, miniaturization of electronic elements, and high-density wiring of PCBs, electronic materials require especially low dielectric properties. The conventional electronic material obtained from an epoxy resin composition is insufficient in terms of dielectric properties and therefore has been replaced by the conventional electronic material obtained from a polyphenylene ether resin composition.

A polyphenylene ether resin composition usually contains an isocyanurate compound with a carbon-carbon double bond or a cyanurate compound with a carbon-carbon double bond as a cross-linking agent. Such a cross-linking agent can be found in JP 2003-002992 A and JP 2005-238477 A and is useful in curing elastomers or thermoplastic resins. Examples of the isocyanurate compound with a carbon-carbon double bond or cyanurate compound with a carbon-carbon double bond include triallyl isocyanurate (TAIC) and triallyl cyanurate (TAC). For example, U.S. Pat. No. 10,023,707 B2 discloses a thermal-curable polyphenylene ether resin composition comprising TAIC or TAC as a cross-linking agent, wherein TAIC is preferred in terms of thermal resistance and chemical resistance. However, TAIC and TAC are usually in the form of a liquid monomer with high fluidity, which is unfavorable for mass production or continuous production because runback is observed when impregnating a reinforcing material with a resin composition containing TAIC and TAC. In addition, during the preparation of prepregs, TAIC monomers can evaporate and, thus, cause environmental pollution or make the physicochemical properties of the laminates prepared from the prepregs inconsistent with each other. To solve the aforementioned problems, U.S. Pat. No. 9,809,690 B2 discloses a circuit material wherein TAIC monomers or TAC monomers are polymerized into particles and then added into a resin composition as a filler, thereby solving the evaporation problem. Nevertheless, the fluidity of the prepreg prepared during a hot-pressing operation will inevitably deteriorate.

TW 200536862 A teaches to perform a polymerization reaction of 20 mol % to 100 mol % of a divinyl aromatic compound with other optional monomers (such as monomers of ethyl vinyl aromatic compounds) in an organic solvent under the presence of a Lewis acid and an initiator at 20° C. to 120° C. to prepare a soluble polyfunctional vinyl aromatic copolymer with a specific molecular weight. Although the circuit substrate prepared from the copolymer is acceptable in heat resistance and dielectric properties, it is brittle, resulting in high wear of drill and generation of conductive anodic filament (CAF) during the subsequent PCB processing. This is not acceptable in the multi-layer printed circuit board process. CN 1914239 A teaches to perform a reaction of a polyphenylene ether modified by vinyl groups at the terminals with a soluble polyfunctional vinyl aromatic copolymer to prepare a metal-clad laminate having superior chemical resistance and heat resistance. However, the dielectric properties of the prepared metal-clad laminate are insufficient.

In view of the above, there is a need for an electronic material with good dielectric properties, superior peeling strength, glass transition temperature, PCT heat resistance, processing stability, and resistance to deformation (high Young's modulus).

SUMMARY

In view of the aforementioned technical problems, the present invention provides a prepreg that comprises an organic fiber woven fabric impregnated with or coated with a specific thermally curable resin composition. The dielectric materials prepared from the prepreg have superior dielectric constant (Dk), dielectric loss factor (Df), glass transition temperature (Tg), PCT heat resistance, peeling strength, processing stability, and resistance to deformation (high Young's modulus).

Therefore, an objective of the present invention is to provide a prepreg, which comprises an organic fiber woven fabric impregnated with or coated with a thermally curable resin composition, wherein the thermally curable resin composition comprises:

(A) a polyphenylene ether resin having an unsaturated functional group;

(B) a polyfunctional vinyl aromatic copolymer; and (C) a compound having the structure of formula (I), formula (I)

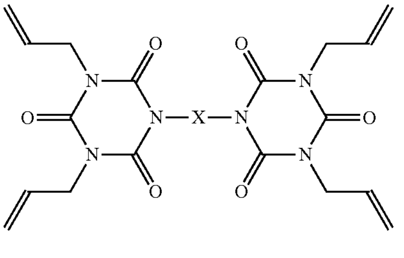

wherein, in formula (I), X is a C1-C10 linear or branched alkylene; and the polyfunctional vinyl aromatic copolymer (B) is prepared by copolymerizing one or more divinyl aromatic compounds with one or more monovinyl aromatic compounds.

In some embodiments of the present invention, the polyphenylene ether resin (A) having an unsaturated functional group comprises a polyphenylene ether resin represented by the following formula (II):

formula (II)

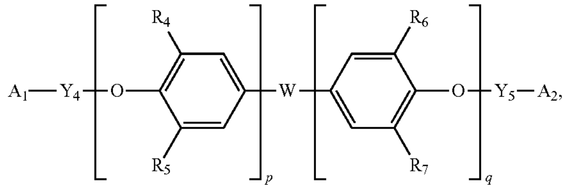

wherein, in formula (II), $R_4$, $R_5$, $R_6$ and $R_7$ are independently H, or a substituted or unsubstituted C1-C5 alkyl;

p and q are independently an integer from 0 to 100, with the proviso that p and q are not 0 at the same time;

$Y_4$ and $Y_5$ are independently a direct bond, a carbonyl group, or an alkenyl-containing group;

$A_1$ and $A_2$ are independently

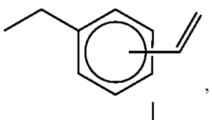 , 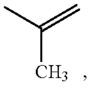 ,

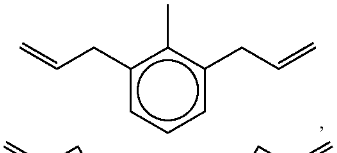 ,

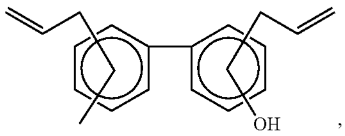 ,

-continued

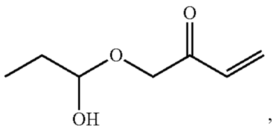 , or 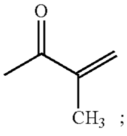 ;

and

W is a direct bond, —O—,

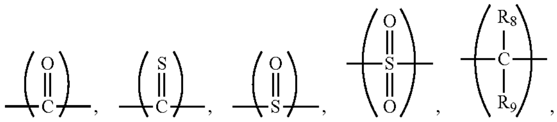

or an aryl, wherein $R_8$ and $R_9$ are independently H or a C1-C12 alkyl.

In some embodiments of the present invention, the weight ratio ((A):(B)) of the polyphenylene ether resin (A) having an unsaturated functional group to the polyfunctional vinyl aromatic copolymer (B) is 10:1 to 1:3.

In some embodiments of the present invention, the divinyl aromatic compound is selected from the group consisting of divinylbenzene, divinylnaphthalene, divinylbiphenyl, and isomers of the preceding compounds.

In some embodiments of the present invention, the monovinyl aromatic compound is selected from the group consisting of nuclear-alkyl-substituted vinyl aromatic compound, α-alkyl-substituted vinyl aromatic compound, β-alkyl-substituted vinyl aromatic compound, and alkoxyl-substituted vinyl aromatic compound.

In some embodiments of the present invention, the compound (C) having the structure of formula (I) is selected from the group consisting of 1,1'-(1,1-methyl)bis(3,5-diallyl-1,3,5-triazine-2,4,6-trione), 1,1'-(1,2-ethyl)bis(3,5-diallyl-1,3,5-triazine-2,4,6-trione), 1,1'-(1,3-propyl)bis(3,5-diallyl-1,3,5-triazine-2,4,6-trione), 1,1'-(1,4-butyl)bis(3,5-diallyl-1,3,5-triazine-2,4,6-trione), 1,1'-(1,5-pentyl)bis(3,5-diallyl-1,3,5-triazine-2,4,6-trione), 1,1'-(1,6-hexyl)bis(3,5-diallyl-1,3,5-triazine-2,4,6-trione), 1,1'-(1,7-heptyl)bis(3,5-diallyl-1,3,5-triazine-2,4,6-trione), 1,1'-(1,8-octyl)bis(3,5-diallyl-1,3,5-triazine-2,4,6-trione), 1,1'-(1,9-nonyl)bis(3,5-diallyl-1,3,5-triazine-2,4,6-trione), 1,1'-(1,10-decyl)bis(3,5-diallyl-1,3,5-triazine-2,4,6-trione), and combinations thereof.

In some embodiments of the present invention, the organic fiber woven fabric is selected from the group consisting of a polypropylene fiber woven fabric, a polyamide fiber woven fabric, a polyethylene fiber woven fabric, a poly-p-phenylenebenzobisthiazole fiber woven fabric, a polypyridobisimidazole (PIPD) fiber woven fabric, a polybenzothiazole fiber woven fabric, a liquid crystal polymer (LCP) fiber woven fabric, and combinations thereof, preferably a liquid crystal polymer.

In some embodiments of the present invention, the thermally curable resin composition further comprises an additive selected from the group consisting of flame retardants, catalysts, fillers, elastomers, dispersing agents, tougheners, viscosity modifiers, thixotropic agents, defoaming agents, leveling agents, surface treating agents, stabilizers, antioxidants, and combinations thereof.

In some embodiments of the present invention, the catalyst is selected from the group consisting of dicumyl peroxide, tert-butyl peroxybenzoate, di-tert-amyl peroxide (DTAP), isopropylcumyl-tert-butyl peroxide, tert-butylcumylperoxide, di(isopropylcumyl) peroxide, di-tert-butyl peroxide, α,α'-bis(tert-butylperoxy)diisopropyl benzene, benzoyl peroxide (BPO), 1,1-bis(tert-butylperoxy)-3,3,5-trimethylcyclohexane, 4,4-di(tert-butylperoxy)butyl valerate, 2,5-dimethyl-2,5-di(tert-butylperoxy)hexane, 2,5-dimethyl-2,5-di(tert-butylperoxy)-3-hexyne, and combinations thereof.

In some embodiments of the present invention, the elastomer is selected from the group consisting of polybutadiene, styrene-butadiene copolymer, styrene-butadiene-divinylbenzene copolymer, polyisoprene, styrene-isoprene copolymer, acrylonitrile-butadiene copolymer, acrylonitrile-butadiene-styrene copolymer, functional modified derivatives of the preceding compounds, and combinations thereof.

Another objective of the present invention is to provide a laminate, which comprises a dielectric layer and a conductive layer covering the surface of the dielectric layer, wherein the dielectric layer is provided by the aforementioned prepreg.

Yet another objective of the present invention is to provide a printed circuit board prepared from the aforementioned laminate.

To render the above objectives, technical features, and advantages of the present invention more apparent, the present invention will be described in detail with reference to some embodiments hereinafter.

BRIEF DESCRIPTION OF THE DRAWINGS

Not applicable.

DETAILED DESCRIPTION

Hereinafter, some embodiments of the present invention will be described in detail. However, the present invention may be embodied in various embodiments, and the protection scope of the present invention should not be limited to those described in the specification.

Unless it is additionally explained, the expressions "a," "the," or the like recited in the specification and in the claims should include both the singular and the plural forms.

Unless it is additionally explained, while describing the amount of the components in the solution, mixture, composition, or varnish in the specification, the weight of the solvent is not included.

By impregnating or coating an organic fiber woven fabric with a thermally curable resin composition comprising a polyphenylene ether resin having an unsaturated functional group, a polyfunctional vinyl aromatic copolymer, and a compound with a specific structure, the present invention provides a prepreg useful for providing a dielectric material having superior dielectric constant (Dk), dielectric loss factor (Df), glass transition temperature (Tg), PCT heat resistance, peeling strength, processing stability, and resistance to deformation (high Young's modulus). The prepreg of the present invention and applications thereof are described in detail below.

1. PREPREG

The prepreg of the present invention comprises a prepreg comprising an organic fiber woven fabric impregnated with or coated with a thermally curable resin composition with specific components. The prepreg of the present invention is described in detail below.

1.1. Thermally Curable Resin Composition

In the present invention, the thermally curable composition comprises (A) a polyphenylene ether resin having an unsaturated functional group, (B) a polyfunctional vinyl aromatic copolymer, and (C) a compound with a specific structure as the essential components and may further comprise optional components.

1.1.1. (A) Polyphenylene Ether Resin having an Unsaturated Functional Group As used herein, the polyphenylene ether resin having an unsaturated functional group (A) refers to a resin with at least a repeating unit

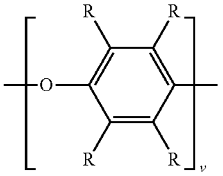

in the main chain and with unsaturated functional groups at the terminals, wherein each R is independently H or a C1-C5 alkyl, and v is an integer ranging from 1 to 100. The unsaturated functional group refers to a group capable of carrying out addition polymerization with other components with unsaturated functional groups, and the addition polymerization reaction can be initiated by light or heat in the presence of a polymerization initiator. Examples of the unsaturated functional group include but are not limited to vinyl, vinyl benzyl, allyl, acrylate, and methacrylate. Examples of the polyphenylene ether resin having an unsaturated functional group include but are not limited to a vinyl-containing polyphenylene ether resin, an allyl-containing polyphenylene ether resin, a vinyl benzyl-containing polyphenylene ether resin, an acrylate-containing polyphenylene ether resin, and a methacrylate-containing polyphenylene ether resin. Each of the polyphenylene ether resins having an unsaturated functional group can be used alone or in any combination.

The method for preparing the polyphenylene ether resin having an unsaturated functional group is not one of the technical features of the present invention, and people having ordinary skill in the art can carry out the method based on the disclosure of the present invention and ordinary skill. The related methods for preparing the polyphenylene ether resin having an unsaturated functional group are described in, for example, U.S. Pat. No. 6,995,195 B2 (preparation of vinyl benzyl-containing polyphenylene ether resins), U.S. Pat. No. 5,218,030 A (preparation of allyl-containing polyphenylene ether resins), U.S. Pat. No. 5,352,754 A (preparation of methacrylate-containing polyphenylene ether resins), U.S. Pat. No. 6,352,782 B2 and US 2016/0280913 A1. All of the US patents are incorporated herein in their entirety by reference.

In some embodiments of the present invention, the polyphenylene ether resin (A) having an unsaturated functional group comprises one or more polyphenylene ether resins represented by the following formula (II):

formula (II)

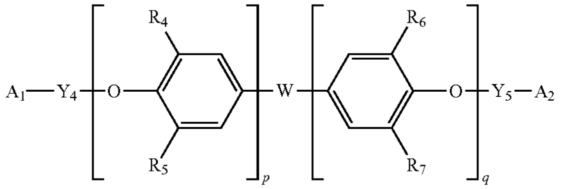

In formula (II), $R_4$, $R_5$, $R_6$ and $R_7$ are independently H, or a substituted or unsubstituted C1-C5 alkyl, and preferably are independently —$CH_3$; p and q are independently an integer from 0 to 100, with the proviso that p and q are not 0 at the same time; $Y_4$ and $Y_5$ are independently a direct bond, a carbonyl group, or an alkenyl-containing group, and preferably are independently a direct bond; $A_1$ and $A_2$ are independently

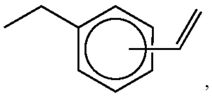 , 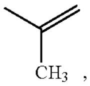 ,

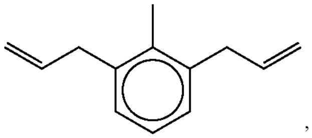 ,

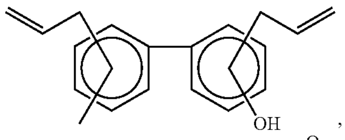 ,

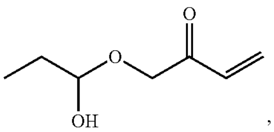 , or 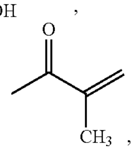 , and preferably are independently

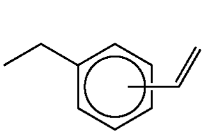 or 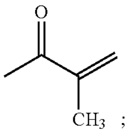 ;

and W is a direct bond, —O—,

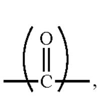, 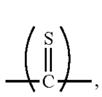, 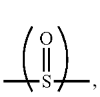, 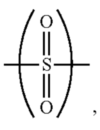 , 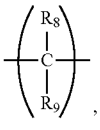 , or an aryl, wherein $R_8$ and $R_9$ are independently H or a C1-C12 alkyl.

In a preferred embodiment of the present invention, the polyphenylene ether resin (A) having an unsaturated functional group may comprise at least two polyphenylene ether resins represented by formula (II), wherein $A_1$ and $A_2$ are independently

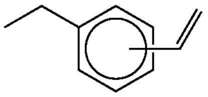

or, W is an aryl or

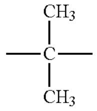 , $Y_4$ and $Y_5$ are direct bonds, $R_4$, $R_5$, $R_6$ and $R_7$ are methyl, and $20 \leq (p+q) \leq 25$.

Examples of commercially available polyphenylene ether resin (A) having an unsaturated functional group include OPE-2st and OPE-2EA available from MITSUBISHI GAS CHEMICAL Company, SA-9000 available from SABIC Company, PP807 available from Chin Yee Chemical Industry Company, and a polyphenylene ether resin available from ASAHI KASEI Company.

The polyphenylene ether resin (A) having an unsaturated functional group can have a weight average molecular weight (Mw) of 1000 to 50,000, preferably 1000 to 10,000, more preferably 1000 to 5000. If the Mw of the polyphenylene ether resin is higher than the aforementioned ranges, the properties of the resin composition, such as moldability (fluidity), solubility, etc., may degrade, making subsequent processing more difficult. If the Mw of the polyphenylene ether resin is lower than the aforementioned range, the dielectric properties and thermal stability of the resin composition may degrade.

Based on the solid content of the thermally curable resin composition, the amount of the polyphenylene ether resin (A) having an unsaturated functional group can be 5 wt % to 25 wt %. For example, based on the solid content of the thermally curable resin composition, the amount of the polyphenylene ether resin (A) having an unsaturated functional group can be 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %, or within a range between any two of the values described herein, but the present invention is not limited thereto.

1.1.2. (B) Polyfunctional Vinyl Aromatic Copolymer

As used herein, the polyfunctional vinyl aromatic copolymer (B) refers to a vinyl aromatic copolymer with at least three reactive vinyl groups. In the resin composition of the present invention, the polyfunctional vinyl aromatic copolymer undergoes crosslinking reaction with the polyphenylene ether resin having an unsaturated functional group via the reactive vinyl groups to form a stereo network structure. As used herein, the reactive vinyl groups include —CH=$CH_2$ and ethylene (—CH=CH—).

The polyfunctional vinyl aromatic copolymer (B) can be obtained by copolymerization of one or more divinyl aromatic compounds, one or more monovinyl aromatic compounds, and optionally other monomers. The thus obtained polyfunctional vinyl aromatic copolymer has one or more reactive vinyl groups at the terminals and one or more reactive ethylene in the main chain, thereby capable of undergoing crosslinking reactions with other components having unsaturated functional groups.

In some embodiments of the present invention, the polyfunctional vinyl aromatic copolymer (B) may comprise the following structural units:

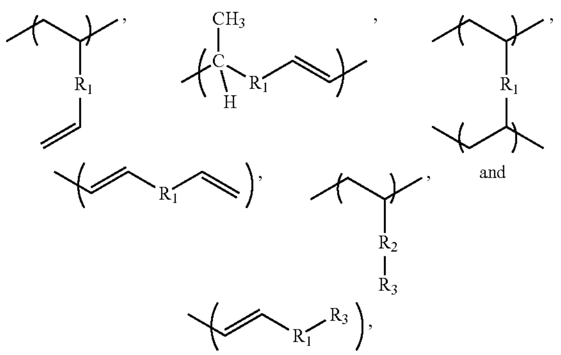

and wherein $R_1$ and $R_2$ are independently a C6-C12 aromatic hydrocarbyl, and $R_3$ is H or a C1-C12 hydrocarbyl.

As used herein, a divinyl aromatic compound refers to an aromatic compound with two vinyl groups. Examples of the divinyl aromatic compound include but are not limited to divinylbenzene, divinylnaphthalene, divinyl-biphenyl, and isomers thereof. Each divinyl aromatic compounds can be used alone or in any combination. In some embodiments of the present invention, the divinyl aromatic compound is divinylbenzene, and examples thereof include but are not limited to m-divinylbenzene and p-divinylbenzene.

As used herein, a monovinyl aromatic compound refers to an aromatic compound with one vinyl group. Examples of the monovinyl aromatic compound include but are not limited to nuclear-alkyl-substituted vinyl aromatic compounds, α-alkyl-substituted vinyl aromatic compounds, β-alkyl-substituted vinyl aromatic compounds, and alkoxy-substituted vinyl aromatic compounds. Each monovinyl aromatic compounds can be used alone or in any combination. In some embodiments of the present invention, the monovinyl aromatic compound is one or more members selected from the group consisting of ethyl vinylbenzene, ethyl vinylnaphthalene, and ethyl vinyl-biphenyl, and is preferably ethyl vinylbenzene, wherein examples of ethyl vinylbenzene include but are not limited to m-ethyl vinylbenzene and p-ethyl vinylbenzene.

Examples of the optionally other monomers useful for preparing the polyfunctional vinyl aromatic copolymer include but are not limited to trivinyl aromatic compounds, trivinyl aliphatic compounds, divinyl aliphatic compounds, and monovinyl aliphatic compounds. The amount of the optionally other monomers is preferably not higher than 50 mol %, more preferably not higher than 30 mol %, based on the total moles of the divinyl aromatic compounds, monovinyl aromatic compounds, and the optionally other monomers. In other words, in the polyfunctional vinyl aromatic copolymer, the majority of the polymerization units are those derived from divinyl aromatic compounds and monovinyl aromatic compounds.

The Mw of the polyfunctional vinyl aromatic copolymer (B) can be 500 to 10,000, preferably 1000 to 5000. If the Mw of the polyfunctional vinyl aromatic copolymer is too high, such as higher than 10,000, the fluidity of the resin composition may degrade, making subsequent processing more difficult. If the Mw of the polyfunctional vinyl aromatic copolymer is too low, such as lower than 500, the heat resistance of the prepared electronic materials may degrade.

An example of the method for preparing the polyfunctional vinyl aromatic copolymer (B) may be described as follows: a method comprising copolymerizing the divinyl aromatic compound, the monovinyl aromatic compounds, and the optionally other monomers in the presence of a Lewis base compound and catalyst, wherein the catalyst is at least one member selected from the group consisting of inorganic acids, organic sulfonic acids, and perchlorates. The Lewis base compound acts as a promoter. During the polymerization reaction, the Lewis base compound can control the interaction between the catalyst and the hydrogen at β position of carbonium to regulate the relative reaction rate between the β-dehydrogenation reaction and the 1,2-addition reaction of vinyl groups. For more details of the preparation method of the polyfunctional vinyl aromatic copolymer (B), reference can be made to TW 201736413 A, which is incorporated herein in its entirety by reference.

Based on the solid content of the thermally curable resin composition, the amount of the polyfunctional vinyl aromatic copolymer (B) can be 1 wt % to 15 wt %. For example, based on the solid content of the thermally curable resin composition, the amount of the polyfunctional vinyl aromatic copolymer (B) can be 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %, or within a range between any two of the values described herein, however the present invention is not limited thereto.

The inventor found that the weight ratio ((A):(B)) of the polyphenylene ether resin (A) having an unsaturated functional group to the polyfunctional vinyl aromatic copolymer (B) is preferably 10:1 to 1:3. For example, the weight ratio ((A):(B)) of the polyphenylene ether resin (A) having an unsaturated functional group to the polyfunctional vinyl aromatic copolymer (B) can be 10:1, 9:1, 8:1, 7:1, 6:1, 5:1; 4:1, 3:1, 2:1, 1:1, 1:2, or 1:3, or within a range between any two of the values described herein. If the amount of the polyfunctional vinyl aromatic copolymer (B) is higher than the aforementioned range, the heat resistance and the peeling strength of the metal-clad laminate prepared are relatively poor. If the amount of the polyfunctional vinyl aromatic copolymer (B) is lower than the aforementioned range, the physical properties and the dielectric loss factor (Df) of the prepared metal-clad laminate are relatively poor.

1.1.3 (C) a Compound Having the Structure of Formula (I)

The thermally curable resin composition comprises a compound (C) having the structure of formula (I), formula (I)

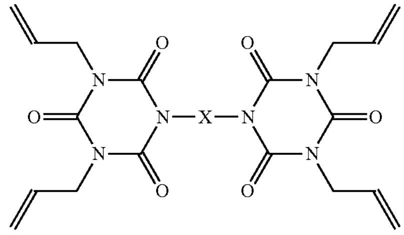

In formula (I), X is a C1-C10 linear or branched alkylene or alkylene chain. As used herein, an "alkylene" or "alkylene chain" refers to a straight or branched divalent hydrocarbyl (alkyl) chain linking other parts of a molecule to another group and is consisting of carbon and hydrogen. Examples of the C1-C10 linear or branched alkylene or alkylene chain include but are not limited to methylene, ethylene, n-propylene, isopropylene, n-butylene, isobutylene, sec-butylene, tert-butylene, n-pentylene, isopentylene, neopentylene, n-hexylene, isohexylene, n-heptylene, isoheptylene, n-octylene, isooctylene, n-nonylene, isononylene, n-decylene, and isodecylene.

Specific examples of the compound (C) having the structure of formula (I) include but are not limited to 1,1'-(1,1-methyl)bis(3,5-diallyl-1,3,5-triazine-2,4,6-trione), 1,1'-(1,2-ethyl)bis(3,5-diallyl-1,3,5-tri azine-2,4,6-trione), 1,1'-(1,3-propyl)bis(3,5-diallyl-1,3,5-tri azine-2,4,6-trione), 1,1'-(1,4-butyl)bis(3,5-diallyl-1,3,5-triazine-2,4,6-trione), 1,1'-(1,5-pentyl)bis(3,5-diallyl-1,3,5-triazine-2,4,6-trione), 1,1'-(1,6-hexyl)bis(3,5-diallyl-1,3,5-triazine-2,4,6-trione), 1,1'-(1,7-heptyl)bis(3,5-diallyl-1,3,5-triazine-2,4,6-trione), 1,1'-(1,8-octyl)bis(3,5-diallyl-1,3,5-triazine-2,4,6-trione), 1,1'-(1,9-nonyl)bis(3,5-diallyl-1,3,5-triazine-2,4,6-trione), 1,1'-(1,10-decyl)bis(3,5-diallyl-1,3,5-triazine-2,4,6-trione), and combinations thereof.

The compound (C) having the structure of formula (I) can be obtained by reacting diallyl isocyanurate with a hydrocarbyl halide in the presence of a catalyst. Examples of the hydrocarbyl halide include but are not limited to hydrocarbyl bromides, such as 2-bromomethane, 2-bromoethane, 2-bromopropane, 2-bromobutane, 2-bromopentane, 2-bromohexane, 2-bromoheptane, 2-bromooctane, 2-bromononane, and 2-bromodecane. Examples of the catalyst include but are not limited to potassium carbonate, potassium hydroxide, sodium carbonate, and sodium hydroxide. Detailed preparation of the compound will be illustrated in the appended Examples.

Based on the solid content of the thermally curable resin composition, the amount of the compound (C) having the structure of formula (I) can be 5 wt % to 25 wt %. For example, based on the solid content of the thermally curable resin composition, the amount of compound (C) having the structure of formula (I) can be 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %, or within a range between any two of the values described herein. If the amount of the compound (C) having the structure of formula (I) is higher than the aforementioned range (such as higher than 25 wt %), the dielectric loss factor (Df) of the electronic materials prepared is relatively high. If the amount of the compound (C) having the structure of formula (I) is lower than the aforementioned range (such as lower than 5 wt %), the cross-linking density of the prepared electronic materials is relatively low, resulting in deteriorated heat resistance. For more details of the preparation method of the compound (C) having the structure of formula (I), reference can be made to CN 104877171 B, which is incorporated herein in its entirety by reference.

1.1.4. Optional Components

The thermally curable resin composition may further comprise optional components, such as the flame retardants, catalysts, fillers, elastomers exemplified below, and additives known in the art, to adaptively improve the processibility of the resin composition during the production process or to improve the physicochemical properties of the electronic materials prepared from the thermally curable resin composition. Examples of additives known in the art include but are not limited to dispersing agents, tougheners, viscosity modifiers, thixotropic agents, defoaming agents, leveling agents, surface treating agents, stabilizers, and antioxidants.

[Flame Retardant]

In general, the flame retardance of the electronic material prepared from the resin composition can be improved by adding a flame retardant to the resin composition. Examples of flame retardants include but are not limited to a phosphorus-containing flame retardant and a bromine-containing flame retardant. The phosphorus-containing flame retardant and the bromine-containing flame retardant can be used alone or together. Examples of the phosphorus-containing flame retardant include but are not limited to phosphate esters, phosphorus oxides, phosphazenes, ammonium polyphosphates, melamine phosphates, melamine cyanurates, and metal phosphinates. Examples of phosphate esters include but are not limited to 9,10-dihydro-9-oxa-10-phosphaphenanthrene-10-oxide based compounds (DOPO compounds) and derivatives thereof, such as di-DOPO compounds. Examples of phosphorus oxides include but are not limited to diphenylphosphine oxide (DPPO) and derivatives thereof, such as bis-DPPO compounds. Examples of phosphazenes include but are not limited to cyclic phosphazene compounds and linear phosphazene compounds. Examples of cyclic phosphazene compounds include but are not limited to hexaphenoxy cyclotriphosphazene. Examples of metal phosphates include but are not limited to the compounds of the following formula (III):

formula (III)

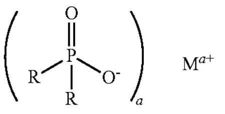

In formula (III), each R is independently a $C_1$ to $C_5$ alkyl; $M^{a+}$ is a metal ion selected from the group consisting of $Al^{3+}$, $Zn^{2+}$, $Ca^{2+}$, $Ti^{4+}$, $Mg^{2+}$, $Sr^{2+}$, $Ba^{2+}$, $K^{+}$, and $Cu^{2+}$; and a is an integer ranging from 1 to 4. Each of the mentioned phosphorus-containing flame retardants can be used alone or in any combination.

Examples of bromine-containing flame retardants include but are not limited to tetrabromobisphenol A, decabromodiphenyloxide, decabrominated diphenyl ethane, 1,2-bis(tribromophenyl)ethane, brominated epoxy oligomers, octabromotrimethylphenyl indane, bis(2,3-dibromopropyl ether), tris(tribromophenyl)triazine, brominated aliphatic hydrocarbons, and brominated aromatic hydrocarbons. Each of the mentioned bromine-containing flame retardants can be used alone or in any combination.

Based on the solid content of the thermally curable resin composition, the amount of the flame retardant can be 0 wt % to 10 wt %. For example, based on the solid content of the thermally curable resin composition, the amount of the flame retardant can be 0.5 wt %, 1 wt %, 2 wt %, 3 wt %, 4 wt %, 5 wt %, 6 wt %, 7 wt %, 8 wt %, 9 wt %, or 10 wt %, or within a range between any two of the values described herein, but the present invention is not limited thereto.

[Catalyst]

The catalyst is a component that can promote a cross-linking reaction. Examples of the catalyst include but are not limited to organic peroxides. Examples of organic peroxides include but are not limited to dicumyl peroxide, tert-butyl peroxybenzoate, di-tert-amyl peroxide (DTAP), isopropylcumyl-tert-butyl peroxide, tert-butylcumylperoxide, di(isopropylcumyl) peroxide, di-tert-butyl peroxide, α,α'-bis(tert-butylperoxy)diisopropyl benzene, benzoyl peroxide (BPO), 1,1-bis(tert-butylperoxy)-3,3,5-trimethylcyclohexane, 4,4-di(tert-butylperoxy)butyl valerate, 2,5-dimethyl-2,5-di(tert-butylperoxy) hexane, and 2,5-dimethyl-2,5-di(tert-butylperoxy)-3-hexyne. The aforementioned organic peroxides can either be used alone or in any combination. In the appended Examples, α,α'-bis(tert-butylperoxy)diisopropyl benzene (Perbutyl P) is used.

Based on the solid content of the thermally curable resin composition, the amount of the catalyst can be 0.1 wt % to 1 wt %. For example, based on the solid content of the thermally curable resin composition, the amount of the catalyst can be 0.1 wt %, 0.2 wt %, 0.3 wt %, 0.4 wt %, 0.5 wt %, 0.6 wt %, 0.7 wt %, 0.8 wt %, 0.9 wt %, or 1 wt %, or within a range between any two of the values described herein, but the present invention is not limited thereto.

[Filler]

The resin composition may further comprise a filler to improve the mechanical strength, thermal conductivity and dimensional stability of the electronic materials prepared. Examples of the fillers include but are not limited to silica (including hollow silica), aluminum oxide, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond, diamond-like carbon, graphite, calcined kaolin, pryan, mica, hydrotalcite, polytetrafluoroethylene powders, glass beads, ceramic whiskers, carbon nanotubes, and nano-sized inorganic powders. Each of the mentioned fillers can be used alone or in any combination.

Based on the solid content of the thermally curable resin composition, the amount of the filler can be 55 wt % to 75 wt %. For example, based on the solid content of the thermally curable resin composition, the amount of the filler can be 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, or 75 wt %, or within a range between any two of the values described herein, but the present invention is not limited thereto.

[Elastomer]

The resin composition may further comprise an elastomer to improve the toughness of the prepared electronic materials. Examples of the elastomer include but are not limited to polybutadiene, styrene-butadiene copolymer, styrene-butadiene-divinylbenzene copolymer, polyisoprene, styrene-isoprene copolymer, acrylonitrile-butadiene copolymer, acrylonitrile-butadiene-styrene copolymer, functional modified derivatives of the preceding compounds. Examples of the functional modified derivatives include but are not limited to maleic anhydride-modified polybutadiene and maleic anhydride-modified polybutadiene-styrene copolymer. Each of the mentioned elastomers can be used alone or in any combination. In the appended Examples, styrene-butadiene copolymer and styrene-butadiene-divinylbenzene copolymer are used.

Based on the solid content of the thermally curable resin composition, the amount of the elastomer can be 1 wt % to 20 wt %. For example, based on the solid content of the thermally curable resin composition, the amount of the elastomer can be 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %, or within a range between any two of the values described herein, but the present invention is not limited thereto.

1.2. Organic Fiber Woven Fabric

In the present invention, the prepreg comprises an organic fiber woven fabric as a reinforcing material. The prepreg of the present invention can have superior glass transition temperature (Tg), dielectric properties, peeling strength, tackiness properties, heat resistance after moisture absorption, water absorption rate, and resistance to deformation (high Young's modulus) by virtue of the synergetic effect of the combined use of the aforementioned thermally curable resin composition and the organic fiber woven fabric. Examples of the organic fiber woven fabric include but are not limited to a polypropylene fiber woven fabric (including a high-modulus polypropylene (HMPP) fiber woven fabric), a polyamide fiber woven fabric, a polyethylene fiber woven fabric (including ultra-high molecular weight polyethylene (UHMWPE) fiber woven fabric), a poly-p-phenylenebenzobisthiazole fiber woven fabric, a polypyridobisimidazole (PIPD) fiber woven fabric, a polybenzothiazole fiber woven fabric, and a liquid crystal polymer (LCP) fiber woven fabric. Each of the mentioned organic fiber woven fabric can be used alone or in any combination.

In some embodiments of the present invention, the organic fiber woven fabric is a liquid crystal polymer fiber woven fabric, produced by using the liquid crystal polymer fibers obtained from the melt spinning of liquid crystal polyester. Liquid crystal polyester is a polyester that exhibits optical anisotropy (liquid crystal property) in the molten phase. The aforementioned anisotropy can be ascertained by, for example, placing a sample on a hot stage, heating it in a nitrogen atmosphere, and observing the transmitted light from the sample.

The type of the liquid crystal polyester is not particularly limited. For example, the liquid crystal polyester may comprise a structural unit derived from an aromatic or alicyclic diol, an aromatic or alicyclic dicarboxylic acid, an aromatic or alicyclic hydroxyl carboxylic acid, an aromatic or alicyclic diamine, an aromatic or alicyclic hydroxyl amine, an aromatic or alicyclic amino carboxylic acid, etc. However, the present invention is not limited thereto.

In some embodiments of the present invention, the liquid crystal polyester may comprise one or more structural unit selected from the group consisting of

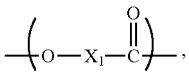, 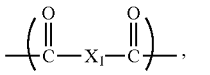,

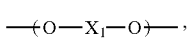, and 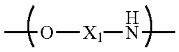, wherein $X_1$ can be

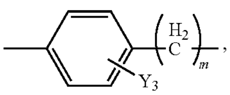, 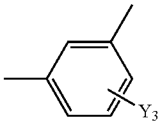,

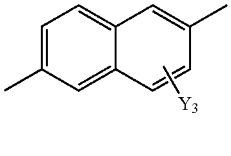,

-continued

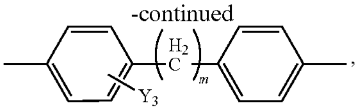,

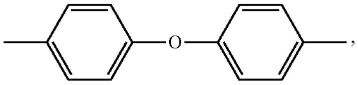,

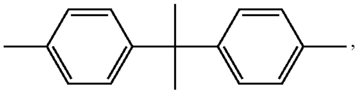,

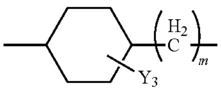, or 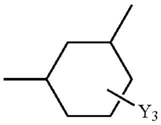, wherein m is an integer of 0 to 2; and $Y_3$ is the group(s) connected to the carbon atom(s) of the aromatic ring or the alicyclic ring, and the number thereof is 1 to the maximum number of possible substitutions in the aromatic ring or in the alicyclic ring, and each $Y_3$ can independently be selected from the group consisting of: H; a halogen atom, such as F, Cl, Br, I; an akyl, such as methyl, ethyl, isopropyl, tert-butyl; an alkoxy, such as methoxy, ethoxy, isopropoxy, n-butoxy; an aryl, such as phenyl, naphthyl; an aralkyl, such as benzyl(phenylmethyl), phenethyl (phenylmethyl); an aryloxy, such as phenoxy; and aralkyloxy, such as benzyloxy.

In some embodiments of the present invention, the liquid crystal ester comprises preferably a structural unit combination selected from the following group:

Combination (1)

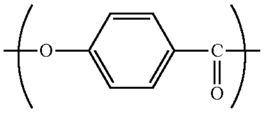,

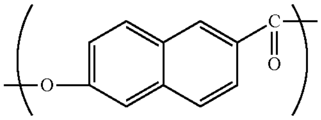

Combination (2)

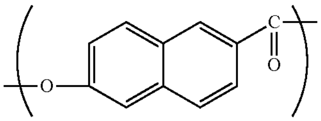,

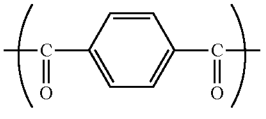, 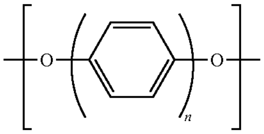

Combination (3)

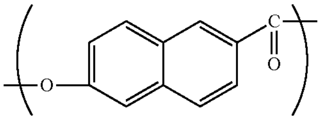,

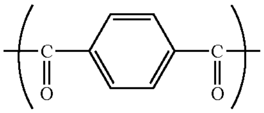, 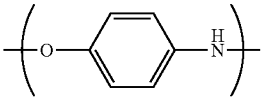

-continued

Combination (4)

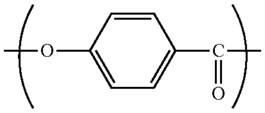,

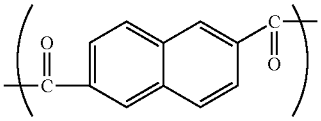,

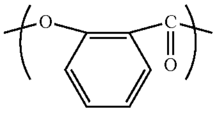, 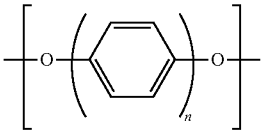

Combination (5)

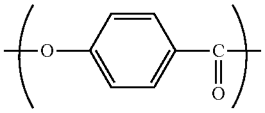,

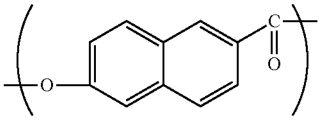,

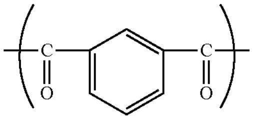, 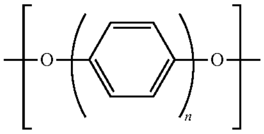

Combination (6)

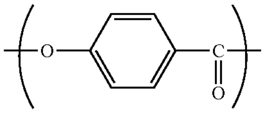,

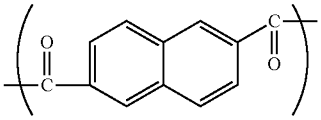,

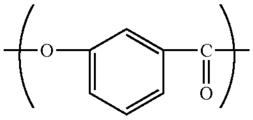, 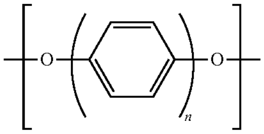

Combination (7)

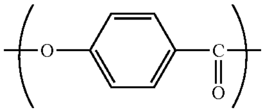,

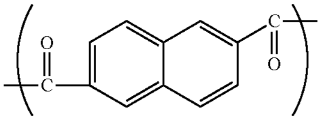,

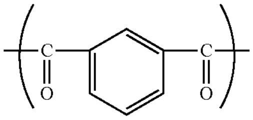, 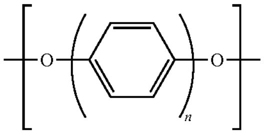

Combination (8)

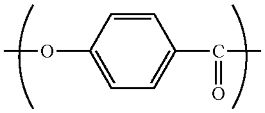,

-continued
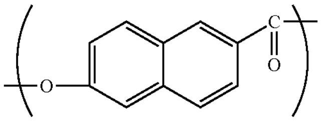,
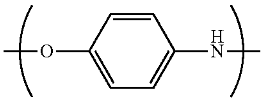, 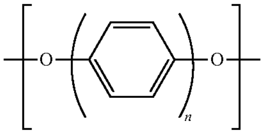,
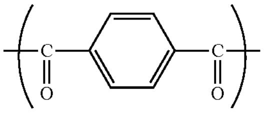
Combination (9)
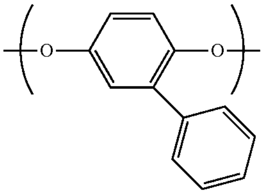, 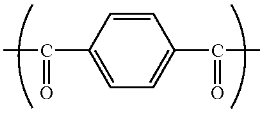
Combination (10)
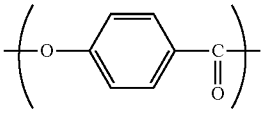, 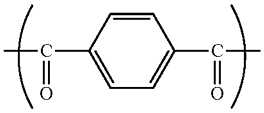,
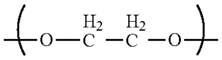
Combination (11)
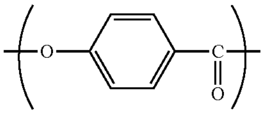, 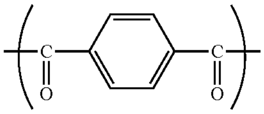,
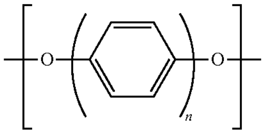, 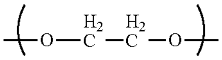
Combination (12)
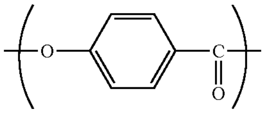,
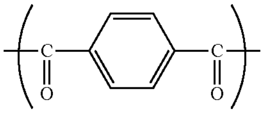, 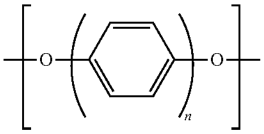
Combination (13)
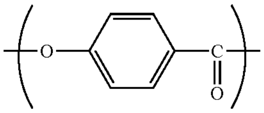, 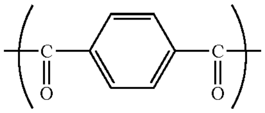,
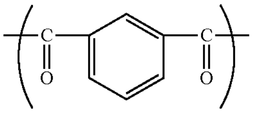, 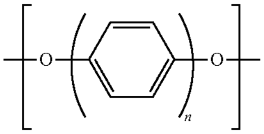,
-continued
Combination (14)
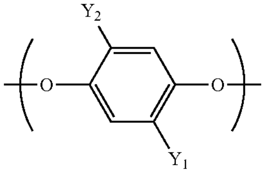, 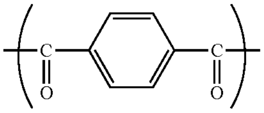,
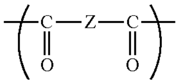
Combination (15)
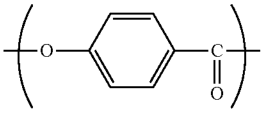, 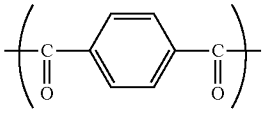,
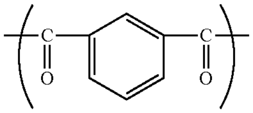, 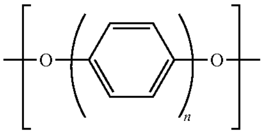,
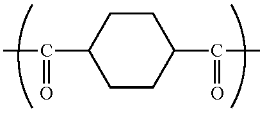
Combination (16)
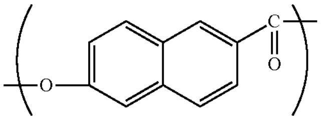,
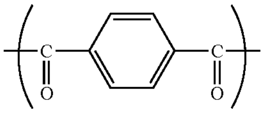,
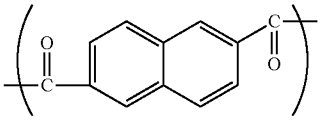,
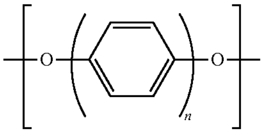
Combination (17)
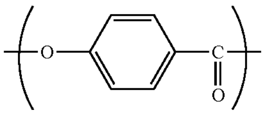,
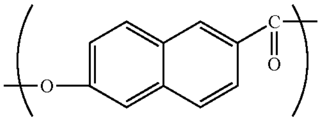,
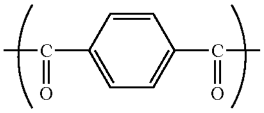, 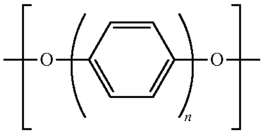

-continued

Combination (18)

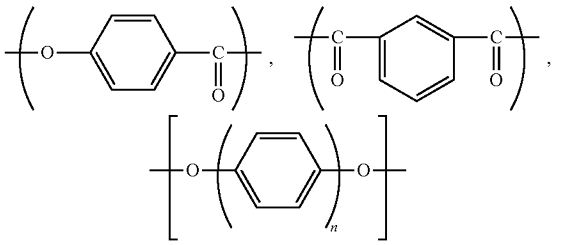

In Combinations (1) to (18), each n is independently an integer of 1 or 2, and each of Combinations (1) to (18) respectively comprises cases where n=1 and n=2 are present alone or present simultaneously;

$Y_1$ and $Y_2$ can independently be selected from the group consisting of: H; a halogen atom, such as F, Cl, Br, I; an akyl, such as methyl, ethyl, isopropyl, tert-butyl; an alkoxy, such as methoxy, ethoxy, isopropoxy, n-butoxy; an aryl, such as phenyl, naphthyl; an aralkyl, such as benzyl(phenylmethyl), phenethyl(phenylmethyl); an aryloxy, such as phenoxy; and aralkyloxy, such as benzyloxy; and Z can be selected from the group consisting of

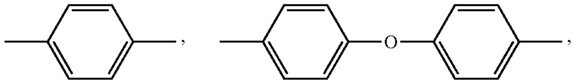

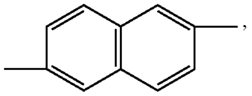

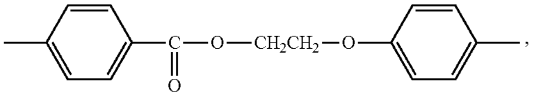

and

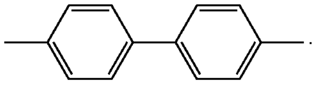

In Combinations (1) to (18), in the case where the structural unit is defined by a general formula, the combination may comprise one or more structural units having the structure of the general formula. For example, Combination (14) may comprise one or more structural units having the structure of the general formula

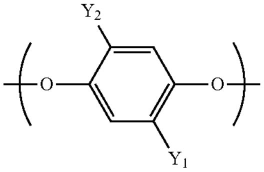

and one or more structural units having the structure of the general formula

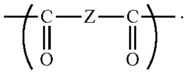

The liquid crystal polyester preferably has a structural unit containing a naphthalene skeleton, more preferably containing a structural unit derived from hydroxybenzoic acid and a structural unit derived from hydroxynaphthoic acid. An example of the structural unit derived from hydroxybenzoic acid includes the structural unit of the following formula (IV), and an example of the structural unit derived from hydroxynaphthoic acid includes the structural unit of the following formula (V).

formula (IV)

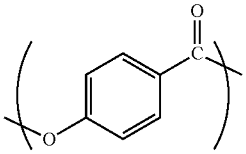

formula (V)

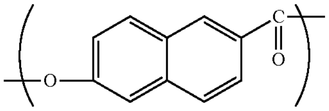

The molar ratio of the structural unit of formula (IV) to the structural unit of formula (V) can be 9:1 to 1:1, more preferably 7:1 to 1:1, particularly preferably 5:1 to 1:1, in terms of improving melt molding. In addition, based on the total moles of the structural units of the liquid crystal polyester, the total amount of the structural unit of formula (IV) and the structural unit of formula (V) can be 65 mol % or more, preferably 70 mol % or more, more preferably 80 mol % or more, but the present invention is not limited thereto. Based on the total moles of the structural units of the liquid crystal polyester, the amount of the structural unit of formula (V) can be 4 to 45 mol %.

The liquid crystal polyester fiber can be produced by melt spinning of the aforementioned liquid crystal polyester in a conventional method, and the liquid crystal polyester fiber can be either a monofilament or a multifilament. The liquid crystal polyester fiber is preferably a multifilament in terms of easily adjusting the thickness and the opening ratio of the liquid crystal fiber woven fabric and obtaining high tensile strength of the prepreg prepared.

In the case where the liquid crystal polyester fiber is a multifilament, the single fiber fineness of the liquid crystal polyester fiber is preferably 0.1 dtex to 50 dtex, more preferably 1 dtex to 20 dtex, particularly preferably 1 dtex to 10 dtex, or within a range between any two of the values described herein. If the single fiber fineness is within the aforementioned range, then the fiber can be hardly cut during the production of the liquid crystal polyester fiber and the woven fabric, and sufficient adhesion to the thermally curable resin composition can be easily obtained.

In addition, the total fineness of the liquid crystal polyester fiber can be, for example, 10 dtex to 10,000 dtex, preferably 10 dtex to 5,000 dtex, more preferably 50 dtex to 3, 000 dtex, particularly preferably 70 dtex to 2,000 dtex. The number of filaments of the liquid crystal polyester fiber can be, for example, 2 to 500, preferably 3 to 300, more preferably 5 to 200. If the total fineness and the number of filaments are within the aforementioned ranges, the prepreg prepared from there can have high mechanical strength.

Examples of commercially available liquid crystal polyester fiber include Vectran UM available from KURARAY Company, Vectran HT available from KURARAY Company, SIVERAS available from TORAY Company, and Zxion available from KB SEIREN Company, etc.

The aforementioned liquid crystal polyester fibers can be used alone or in any combination to be further made into a liquid crystal polymer fiber woven fabric. The liquid crystal polymer fiber woven fabric can have a woven fabric structure in which monofilament or multifilament consisting of the liquid crystal polyester fiber are interlaced as warp and weft. Alternatively, the liquid crystal polymer fiber woven fabric can have a woven fabric structure in which monofilament or multifilament of the liquid crystal polyester fiber are arranged in parallel to form layers and connected with auxiliary fiber. Examples of the auxiliary fiber include but are not limited to spun filaments consisting of such as polyester, nylon, acrylic-based polymer, polyolefin, and polyurethane.

The base weight of the liquid crystal polymer fiber woven fabric can be 10 to 500 g/$m^2$, preferably 15 to 200 g/$m^2$. The warp density and the weft density of the liquid crystal polymer fiber woven fabric can be appropriately selected depending on the raw yarn fineness and the opening ratio. For example, the warp density and the weft density can be independently 1 to 200/2.54 cm (1 inch), preferably 30 to 150/2.54 cm. The thickness of the liquid crystal polymer fiber woven fabric can be 10 μm to 400 μm, preferably 20 μm to 200 μm. If the base weight, warp density, weft density, and thickness of the liquid crystal polymer fiber woven fabric are within the aforementioned ranges, the prepreg prepared using the liquid crystal polymer fiber woven fabric has a better mechanical strength.

The ratio of the major axis to the minor axis (major axis/minor axis) of the fibers in the liquid crystal fiber woven fabric can be 1.1 to 3.0, preferably 1.3 to 2.8. If the ratio of the major axis to the minor axis of the fibers is lower than the aforementioned range, the effect of thinning may not be provided. If the ratio of the major axis to the minor axis is higher than the aforementioned range, the woven fabric may not sufficiently adhere to the thermally curable resin composition. The ratio of the major axis to the minor axis of the fibers is determined by photographing the cross-section of the woven fabric with a scanning electron microscope (SEM), measuring the major axis and minor axis for 100 pieces of liquid crystal polyester fiber randomly selected from the cross-sectional photograph, and calculating the ratio of the major axis/minor axis of each fiber to obtain the average value.

1.3. Preparation of Prepreg

The prepreg of the present invention can be prepared by impregnating the organic fiber woven fabric with the thermally curable resin composition and drying the impregnated organic fiber woven fabric. Alternatively, the thermally curable resin composition can be made into a film, and then the film and the organic fiber woven fabric can be combined via hot-pressing.

The thermally curable resin composition can be prepared into a varnish for subsequent processing by uniformly mixing the components of the resin composition, including the polyphenylene ether resin (A) having an unsaturated functional group, the polyfunctional vinyl aromatic copolymer (B), the compound (C) having the structure of formula (I), and optional components, with a stirrer, and dissolving or dispersing the resultant mixture in a solvent. The solvent can be any inert solvent that can dissolve or disperse the components of the resin composition but does not react with the components of the resin composition. Examples of the solvent that can dissolve or disperse the components of the resin composition include but are not limited to toluene, γ-butyrolactone, methyl ethyl ketone, cyclohexanone, butanone, acetone, xylene, methyl isobutyl ketone, N,N-dimethylformamide (DMF), N,N-dimethylacetamide (DMAc), and N-methylpyrolidone (NMP). Each of the mentioned solvents can be used alone or in any combination. The content of the solvent in the resin composition is not particularly limited as long as the components of the resin composition can be well dissolved or dispersed therein. In some embodiments of the present invention, the solvent is a mixture of toluene and methyl ethyl ketone.

In some embodiments of the present invention, VECTRAN HT0150 liquid crystal polymer woven fabric available from Kuraray Company is used as the organic fiber woven fabric, and a semi-cured prepreg is provided by a heating and drying process at 160° C. for 2 to 15 minutes (B-stage).

2. LAMINATE AND PRINTED CIRCUIT BOARD

The present invention also provides a laminate, which comprises a dielectric layer and a conductive layer covering the surface of the dielectric layer, wherein the aforementioned prepreg provides the dielectric layer. Specifically, the laminate can be prepared by superimposing one or more layers of the aforementioned prepreg to provide a dielectric layer, superimposing a metal foil (such as copper foil) on at least one external surface of the dielectric layer to provide a superimposed object, and then performing a hot-pressing operation to the superimposed object to obtain the laminate.

The aforementioned metal-clad laminate can form a printed circuit board by further patterning the external metal foil thereof. An example of a patterning method includes but is not limited to etching.

3. EXAMPLES

3.1. Testing Methods

The present invention is further illustrated by the embodiments hereinafter, wherein the testing instruments and methods are as follows.

[Glass Transition Temperature (Tg)]

The laminate for evaluation is etched to remove the copper foils at both sides to obtain an unclad laminate. The unclad laminate is subjected to a glass transition temperature (Tg) test. Specifically, the Tg of the unclad laminate is determined using a dynamic mechanical analyzer of model number "Q800", available from TA Instruments. The testing conditions are as follows: the mode is bending mode, the frequency is 10 Hz, the heating rate is 5° C./min, and the dynamic viscoelasticity is measured during the course of heating from room temperature to 280° C. The Tg is the temperature at which tan δ in the resulting viscoelasticity curve is at maximum.

[Dielectric Constant (Dk) and Dielectric Loss Factor (Df) Measurement]

The dielectric constant (Dk) and dielectric loss factor (Df) are measured and calculated according to IPC-TM-650 2.5.5.13 standard under an operating frequency of 10 GHz.

[Peeling Strength]

The peeling strength refers to the adhesion of the metal foil to the dielectric layer. The peeling strength is expressed by the force required for vertically peeling a ⅛-inch-wide copper foil (0.5 oz.) from the laminate. The unit of the peel strength is lbf/in.

[Tackiness Test]

The impregnated or coated organic fiber woven fabric is dried under 130° C. to 180° C. for 2 to 5 minutes (B-stage) to obtain a semi-cured prepreg. After that, the stacking of the prepreg is observed by the unaided eye. If no spatting or tacky phenomena is found, the prepreg is not tacky and has good processibility, and the result is recorded as "O"; and if spalling or tacky phenomena is found, the prepreg is tacky and has poor processibility, and the result is recorded as "X".

[Heat Resistance after Moisture Absorption Test (PCT Heat Resistance Test)]

PCT thermal resistance is also known as moisture absorption thermal resistance and is performed according to JIS C5012. PCT thermal resistance is used to evaluate the thermal resistance of a solder-floated laminate after laying the laminate at a temperature of 60° C. and a relative humidity of 60% for 120 hours. The solder-floating is performed at a solder bath temperature of 288° C. for 60 seconds. The solder-floated laminate is inspected visually and by an optical microscope (a magnification of 5× to 1000× can be used) to see if there are deficiencies, such as measling or swelling. If no defects such as measling or swelling are found, the PCT thermal resistance test result is recorded as "O", meaning that the laminate passes the PCT thermal resistance test. If any defects such as measling or swelling are found, the PCT thermal resistance test result is recorded as "X", meaning that the laminate fails in the PCT thermal resistance test.

[Water Absorption Rate Test]

The water absorption rate test is conducted according to IPC-TM650 2.6.2.1. The prepreg is cut into a sample of 2 inch×2 inch and is dried and weighted (precisely weighted to 0.1 mg). After that, the sample is soaked in a distilled water bath at a constant temperature of 23±1.1° C. for 24 hours, and after water absorption, the sample is weighted again (precisely weighted to 0.1 mg). The ratio in the percentage of the difference between the weight of the sample after water absorption and the dry weight of the sample relative to the dry weight of the sample is the water absorption rate.

[Young's Modulus Test]

Young's modulus is an indication for evaluating the deformation resistance of the material and is performed according to the method of IPC-TM 650 2.4.18.3. A sample having a size of 76.2 mm in length×12.7 mm in width and a thickness >10 μm is prepared, and the sample is subjected to a tensile test with a tensile rate of 12.5 mm/min. The stress and strain values of the sample before and after deformation are recorded. The ratio of the stress to the strain (stress/strain) is Young's modulus value.

3.2. Preparation of the Compound Having the Structure of Formula (I)

Synthesis Example 1

0.2 mole of 2,4,6-triallyl-1,3,5-triazine, 1.49 g of copper chloride dehydrate, and 0.2 mole of allyl alcohol were dissolved in 80 mL of toluene, and were heated at a temperature of 112° C., refluxed for 2 hours, and then cooled for reprecipitation, followed by filtering with 2% HCl solution and drying to obtain 3,5-diallyl isocyanurate propylamine. 0.17 mole of the obtained 3,5-diallyl isocyanurate propylamine was added to 400 mL (0.2 mole) of an aqueous sodium hydroxide solution, reacted at a temperature of 70° C. for 1 hour and then cooled to room temperature, vacuum dried to remove moisture, and purified to obtain 3,5-diallyl isocyanurate propylamine sodium salt. All of the 3,5-diallyl isocyanurate propylamine sodium salt and 1,4-dichlorobutane in a molar ratio of 2:1 were dissolved in dimethylformamide, reacted at a temperature of 54° C. for 4 hours, cooled to room temperature, filtered to remove inorganic substances, dried and purified to obtain 1,1'-(1,4-butyl)bis (3,5-diallyl-1,3,5-triazine-2,4,6-trione) (hereinafter "Di-L-DAIC"). The structure of the obtained compound is shown below:

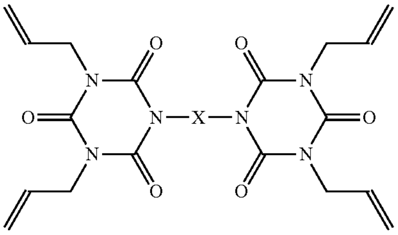

, X = $C_4$ butylene

3.3. Preparation of Prepreg

3.3.1. List of Raw Materials Used in Examples and Comparative Examples

| Raw material | Description |
|---|---|
| SA9000 | Polyphenylene ether resin having an unsaturated functional group, available from SABIC Company. |
| OPE-2st | Polyphenylene ether resin having an unsaturated functional group, available from Mitsubishi gas chemical Company, having a solid content of 63.5 wt %. |
| ODV-XET-3 | Polyfunctional vinyl aromatic copolymer, available from Nippon Steel Chemical & Material Company, having a solid content of 50 wt %. |
| ODV-XET-4 | Polyfunctional vinyl aromatic copolymer, available from Nippon Steel Chemical & Material Company, having a solid content of 50 wt %. |
| Di-L-DAIC | Compound having the structure of formula (I), prepared in Synthesis Example 1. |
| TAIC | Triallyl isocyanurate, available from Evonik Company. |
| DVB | Divinylbenzene, available from Nippon Steel Chemical & Material Company. |
| Ricon 100 | Styrene-butadiene copolymer, available from Cray Valley Company. |
| Ricon 257 | Styrene-butadiene-divinylbenzene copolymer, available from Cray Valley Company, having a solid content of 53 wt %. |

-continued

| Raw material | Description |
|---|---|
| PERBUTYL P | Catalyst, available from NOF Corporation Company. |
| PT-180 | Filler, available from Momentive performance materials Company. |
| SC-5500 SVC | Silica filler, available from Adamatechs Company. |
| HT0150 | Liquid crystal polymer woven fabric, available from Kuraray Company. |
| MBBK40F | Liquid crystal polymer non-woven fabric, available from Kuraray Company |
| NE-glass 1078 | Glass fiber fabric, available from Nitto Boseki Company. |

3.3.2. Preparation Method

According to the components and proportions of the thermally curable resin compositions shown in Table 1-1 and Table 1-2, the components were mixed using a stirrer at room temperature for 60 minutes, then toluene and methyl ethyl ketone were added as the mixed solvent. The resultant mixtures were stirred at room temperature for about 60 to 120 minutes to obtain the thermally curable resin compositions, respectively.

The reinforcing materials, as shown in Table 1-1 and Table 1-2, were respectively impregnated with the resin compositions obtained above through roll coaters. Then, the impregnated reinforcing materials were placed in an oven and heated and dried at 160° C. for 3 minutes to obtain the prepregs of Examples E1 to E9 and Comparative Examples CE1 to CE10.

TABLE 1-1

| Unit: parts by weight | | | E1 | E2 | E3 | E4 | E5 | E6 | E7 | E8 | E9 |
|---|---|---|---|---|---|---|---|---|---|---|---|
| Thermally curable resin composition | Polyphenylene ether resin having an unsaturated functional group | SA9000 | | | | | 50 | | | | |
| | | OPE-2st | 60 | 60 | 20 | 20 | | 50 | 50 | 50 | 50 |
| | Polyfunctional vinyl aromatic copolymer | ODV-XET-3 | 10 | | 50 | 20 | 20 | | 20 | 20 | 20 |
| | | ODV-XET-4 | | 10 | | | | 20 | | | |
| | Unsaturated monomer | Di-L-DAIC | 20 | 20 | 20 | 50 | 20 | 20 | 20 | 20 | 20 |
| | | TAIC | | | | | | | | | |
| | | DVB | | | | | | | | | |
| | Elastomer | Ricon 100 | | | | | | | 40 | | |
| | | Ricon 257 | 10 | 10 | 10 | 10 | 10 | 40 | | | 10 |
| | Catalyst | PERBUTYL P | 1 | 1 | 1 | 1 | 1 | 1 | 1 | 1 | 1 |
| | Filler | PT-180 | | | | | | 50 | | | |
| | | SC-5500 SVC | 150 | 150 | 150 | 150 | 150 | 100 | 150 | 150 | 150 |
| Reinforcing material | | HT0150 | 1 | 1 | 1 | 1 | 1 | 1 | 1 | 1 | 1 |
| | | MBBK40F | | | | | | | | | |
| | | NE-glass 1078 | | | | | | | | | |

TABLE 1-2

| Unit: parts by weight | | | CE1 | CE2 | CE3 | CE4 | CE5 | CE6 | CE7 | CE8 | CE9 | CE10 |
|---|---|---|---|---|---|---|---|---|---|---|---|---|
| Thermally curable resin composition | Polyphenylene ether resin having an unsaturated functional group | SA9000 | | | | | | | | | | |
| | | OPE-2st | 60 | 60 | 60 | 60 | 50 | 50 | 90 | | | |
| | Polyfunctional vinyl aromatic copolymer | ODV-XET-3 | 10 | 10 | 10 | 10 | | 40 | | | 90 | |
| | | ODV-XET-4 | | | | | | | | | | 45 |
| | Unsaturated monomer | Di-L-DAIC | 20 | 20 | | | 40 | | | 90 | | 45 |
| | | TAIC | | | 20 | | | | | | | |
| | | DVB | | | | 20 | | | | | | |
| | Elastomer | Ricon 100 | | | | | | | | | | |
| | | Ricon 257 | 10 | 10 | 10 | 10 | 10 | 10 | 10 | 10 | 10 | 10 |
| | Catalyst | PERBUTYL P | 1 | 1 | 1 | 1 | 1 | 1 | 1 | 1 | 1 | 1 |
| | Filler | PT-180 | | | | | | | | | | |
| | | SC-5500 SVC | 150 | 150 | 150 | 150 | 150 | 150 | 150 | 150 | 150 | 150 |
| Reinforcing material | | HT0150 | | | 1 | 1 | 1 | 1 | 1 | 1 | 1 | 1 |
| | | MBBK40F | 1 | | | | | | | | | |
| | | NE-glass 1078 | | 1 | | | | | | | | |

3.4. Properties Measurements of Prepreg

The properties of the prepreg of Examples E1 to E9 and Comparative Examples CE1 to CE10, including glass transition temperature (Tg), dielectric constant (Dk), dielectric loss factor (Df), peeling strength, tackiness properties, heat resistance after moisture absorption, water absorption rate, and Young's modulus, were tested according to the aforementioned testing methods, and the results are tabulated in Table 2-1 and 2-2.

TABLE 2-1

| | E1 | E2 | E3 | E4 | E5 | E6 | E7 | E8 | E9 |
|---|---|---|---|---|---|---|---|---|---|
| Tg (° C.) | 232 | 236 | 218 | 211 | 224 | 205 | 207 | 239 | 230 |
| Dk (10 GHz) | 3.0 | 2.9 | 2.9 | 2.9 | 3.1 | 2.9 | 2.9 | 3.2 | 3.0 |
| Df (10 GHz) | 0.0016 | 0.0017 | 0.0018 | 0.0017 | 0.0018 | 0.0015 | 0.0016 | 0.0020 | 0.0018 |
| Peeling strength (lbf/in) | 5.0 | 4.9 | 4.7 | 4.6 | 4.6 | 4.5 | 4.4 | 4.6 | 4.8 |
| Tackiness | ○ | ○ | ○ | ○ | ○ | ○ | ○ | ○ | ○ |
| Heat resistance after moisture absorption | ○ | ○ | ○ | ○ | ○ | ○ | ○ | ○ | ○ |
| Water absorption rate | 0.19 | 0.20 | 0.18 | 0.21 | 0.22 | 0.20 | 0.22 | 0.21 | 0.19 |
| Young's modulus (GPa) | 27.2 | 26.9 | 22.4 | 21.8 | 23.3 | 20.7 | 20.5 | 26.9 | 24.0 |

TABLE 2-2

| | CE1 | CE2 | CE3 | CE4 | CE5 | CE6 | CE7 | CE8 | CE9 | CE10 |
|---|---|---|---|---|---|---|---|---|---|---|
| Tg (° C.) | 226 | 229 | 233 | 231 | 178 | 203 | 245 | 152 | 174 | 166 |
| Dk (10 GHz) | 3.2 | 3.0 | 3.2 | 3.1 | 2.9 | 3.2 | 3.2 | 2.8 | 3.3 | 3.1 |
| Df (10 GHz) | 0.0022 | 0.0018 | 0.0025 | 0.0024 | 0.0028 | 0.0029 | 0.0024 | 0.0039 | 0.0042 | 0.0020 |
| Peeling strength (lbf/in) | 4.7 | 4.8 | 4.7 | 4.6 | 3.3 | 3.5 | 4.6 | 2.1 | 2.6 | 2.2 |
| Tackiness | ○ | ○ | X | X | ○ | ○ | ○ | ○ | ○ | ○ |
| Heat resistance after moisture absorption | ○ | X | ○ | ○ | ○ | ○ | ○ | X | X | X |
| Water absorption rate | 0.19 | 0.19 | 0.20 | 0.19 | 0.20 | 0.19 | 0.18 | 0.23 | 0.25 | 0.22 |
| Young's modulus (GPa) | 10.8 | 33.4 | 25.4 | 26.1 | 14.6 | 17.7 | 22.0 | 13.9 | 16.7 | 15.2 |

As shown in Table 2-1 and Table 2-2, the prepregs of the present invention have superior glass transition temperature (Tg), dielectric properties, peeling strength, tackiness properties, heat resistance after moisture absorption, water absorption rate, and resistance to deformation (high Young's modulus). By contrast, Comparative Examples CE1 and CE2 show that if the liquid polymer woven fabric is not used as the reinforcing material, the aforementioned good properties cannot be simultaneously obtained. Comparative Examples CE3 and CE4 show that if an unsaturated monomer different from the compound having the structure of formula (I) of the present invention is used, the dielectric loss factor and the tackiness properties are poor. Comparative Examples CE5 to CE10 show that if one of the polyphenylene ether resin (A) having an unsaturated functional group, the polyfunctional vinyl aromatic copolymer (B), and the compound (C) having the structure of formula (I) is not used, the aforementioned good properties cannot be simultaneously obtained. Moreover, the comparison between Example E9 and Comparative Examples CE5 and CE6 further shows that, compared to the comparative embodiments where only the polyphenylene ether resin (A) having an unsaturated functional group and the polyfunctional vinyl aromatic copolymer (B) were used or only the polyphenylene ether resin (A) having an unsaturated functional group and the compound (C) having the structure of formula (I) were used, the present invention can provide further improvement in especially glass transition temperature, dielectric loss factor, peeling strength, and resistance to deformation (high Young's modulus) by using the polyphenylene ether resin (A) having an unsaturated functional group, the polyfunctional vinyl aromatic copolymer (B) and the compound (C) having the structure of formula (I) in combination.

The above examples illustrate the principle and efficacy of the present invention and show the inventive features thereof. People skilled in this field may proceed with a variety of modifications and replacements based on the disclosures and suggestions of the invention as described without departing from the principle thereof. Therefore, the scope of protection of the present invention is as defined in the claims as appended.

What is claimed is:

1. A prepreg, which comprises a liquid crystal polymer fiber woven fabric impregnated with or coated with a thermally curable resin composition, wherein the thermally curable resin composition comprises:

(A) a polyphenylene ether resin having an unsaturated functional group;

(B) a polyfunctional vinyl aromatic copolymer;

(C) a compound having the structure of formula (I);

an elastomer; and a filler, formula (I)

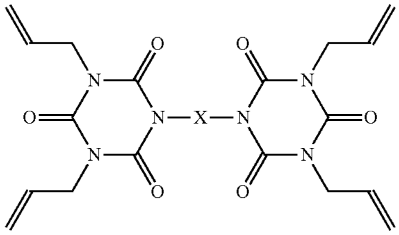

wherein, in formula (I), X is a C1-C10 linear or branched alkylene; and the polyfunctional vinyl aromatic copolymer (B) is prepared by copolymerizing one or more divinyl aromatic compounds with one or more monovinyl aromatic compounds, wherein the polyphenylene ether resin (A) having an unsaturated functional group comprises a polyphenylene ether resin represented by the formula (II):

formula (II)

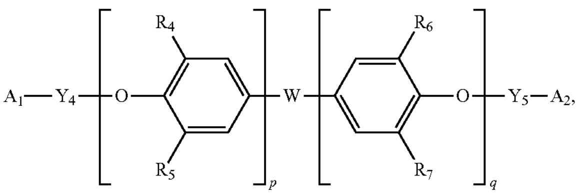

wherein, in formula (II), $R_4$, $R_5$, $R_6$ and $R_7$ are independently H or a substituted or unsubstituted C1-C5 alkyl;

p and q are independently an integer from 0 to 100, with the proviso that p and q are not 0 at the same time, and $20 \leq (p+q) \leq 25$;

$Y_4$ and $Y_5$ are independently a direct bond, a carbonyl group, or an alkenyl-containing group;

$A_1$ and $A_2$ are independently

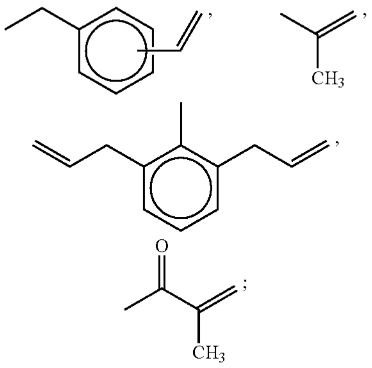

and

W is a direct bond, —O—,

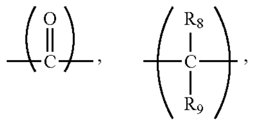

or an aryl, wherein $R_8$ and $R_9$ are independently H or a C1-C12 alkyl.

2. The prepreg of claim 1, wherein the divinyl aromatic compound is selected from the group consisting of divinylbenzene, divinylnaphthalene, divinylbiphenyl, and isomers of the preceding compounds.

3. The prepreg of claim 1, wherein the monovinyl aromatic compound is selected from the group consisting of nuclear-alkyl-substituted vinyl aromatic compound, α-alkyl-substituted vinyl aromatic compound, β-alkyl-substituted vinyl aromatic compound, and alkoxyl-substituted vinyl aromatic compound.

4. The prepreg of claim 1, wherein X is a C4-C8 linear or branched alkylene.

5. The prepreg of claim 1, wherein the compound (C) having the structure of formula (I) is selected from the group consisting of 1,1'-(1,1-methyl)bis(3,5-diallyl-1,3,5-triazine-2,4,6-trione), 1,1'-(1,2-ethyl)bis(3,5-diallyl-1,3,5-triazine-2,4,6-trione), 1,1'-(1,3-propyl)bis(3,5-diallyl-1,3,5-triazine-2,4,6-trione), 1,1'-(1,4-butyl)bis(3,5-diallyl-1,3,5-triazine-2,4,6-trione), 1,1'-(1,5-pentyl)bis(3,5-diallyl-1,3,5-triazine-2,4,6-trione), 1,1'-(1,6-hexyl)bis(3,5-diallyl-1,3,5-triazine-2,4,6-trione), 1,1'-(1,7-heptyl)bis(3,5-diallyl-1,3,5-triazine-2,4,6-trione), 1,1'-(1,8-octyl)bis(3,5-diallyl-1,3,5-triazine-2,4,6-trione), 1,1'-(1,9-nonyl)bis(3,5-diallyl-1,3,5-triazine-2,4,6-trione), 1,1'-(1,10-decyl)bis(3,5-diallyl-1,3,5-triazine-2,4,6-trione), and combinations thereof.

6. The prepreg of claim 1, wherein the thermally curable resin composition further comprises an additive selected from the group consisting of flame retardants, catalysts, dispersing agents, tougheners, viscosity modifiers, thixotropic agents, defoaming agents, leveling agents, surface treating agents, stabilizers, antioxidants, and combinations thereof.

7. The prepreg of claim 6, wherein the catalyst is selected from the group consisting of dicumyl peroxide, tert-butyl peroxybenzoate, di-tert-amyl peroxide (DTAP), isopropylcumyl-tert-butyl peroxide, tert-butylcumylperoxide, di(isopropylcumyl) peroxide, di-tert-butyl peroxide, α,α'-bis(tert-butylperoxy)diisopropyl benzene, benzoyl peroxide (BPO), 1,1-bis(tert-butylperoxy)-3,3,5-trimethylcyclohexane, 4,4-di(tert-butylperoxy)butyl valerate, 2,5-dimethyl-2,5-di(tert-butylperoxy) hexane, 2,5-dimethyl-2,5-di(tert-butylperoxy)-3-hexyne, and combinations thereof.

8. The prepreg of claim 1, wherein the elastomer is selected from the group consisting of polybutadiene, styrene-butadiene copolymer, styrene-butadiene-divinylbenzene copolymer, polyisoprene, styrene-isoprene copolymer, acrylonitrile-butadiene copolymer, acrylonitrile-butadiene-styrene copolymer, functional modified derivatives of the preceding compounds, and combinations thereof.

9. A laminate, which comprises a dielectric layer and a conductive layer covering the surface of the dielectric layer, wherein the prepreg of claim 1 provides the dielectric layer.

10. A printed circuit board, which is prepared from the laminate of claim 9.

* * * * *